United States Patent
Hesselbom

(10) Patent No.: US 7,539,420 B2
(45) Date of Patent: May 26, 2009

(54) NETWORK COMPRISING CONVERTERS BETWEEN ELECTRICAL AND OPTICAL SIGNALS

(75) Inventor: Hjalmar Hesselbom, Huddinge (SE)

(73) Assignee: InvOpto AB, Huddinge (SE)

( * ) Notice: Subject to any disclaimer, the term of this patent is extended or adjusted under 35 U.S.C. 154(b) by 569 days.

(21) Appl. No.: 10/380,325

(22) PCT Filed: Sep. 13, 2001

(86) PCT No.: PCT/SE01/01967

§ 371 (c)(1), (2), (4) Date: Aug. 18, 2003

(87) PCT Pub. No.: WO02/23771

PCT Pub. Date: Mar. 21, 2002

(65) Prior Publication Data

US 2004/0013104 A1    Jan. 22, 2004

(30) Foreign Application Priority Data

Sep. 13, 2000  (SE) ..................... 0003257

(51) Int. Cl.
*H04B 10/02* (2006.01)
*G02B 6/36* (2006.01)

(52) U.S. Cl. .................... 398/139; 398/135; 385/92

(58) Field of Classification Search ............... 398/135, 398/138, 139, 214; 385/92, 139, 73; 439/76.1, 439/297, 607, 680, 681

See application file for complete search history.

(56) References Cited

U.S. PATENT DOCUMENTS

| | | | |
|---|---|---|---|
| 4,545,076 A * | 10/1985 | Biard et al. ................. | 398/208 |
| 4,691,386 A | 9/1987 | Eumurian et al. | |
| 5,541,957 A * | 7/1996 | Lau ........................... | 375/258 |
| 5,896,417 A * | 4/1999 | Lau ........................... | 375/258 |
| 6,204,716 B1 * | 3/2001 | Bremner ..................... | 327/309 |
| 6,206,582 B1 * | 3/2001 | Gilliland ..................... | 385/92 |
| 6,224,268 B1 * | 5/2001 | Manning et al. ............. | 385/56 |
| 6,648,693 B1 * | 11/2003 | Hogan et al. ................ | 439/630 |
| 7,056,157 B2 * | 6/2006 | Herring et al. .............. | 439/680 |
| 2004/0097136 A1 * | 5/2004 | Flickinger et al. .......... | 439/607 |

FOREIGN PATENT DOCUMENTS

JP    10079745    * 3/1998

\* cited by examiner

*Primary Examiner*—Nathan M Curs
(74) *Attorney, Agent, or Firm*—Nixon & Vanderhye, P.C.

(57) ABSTRACT

A network in for example apartment buildings having a partly optical transmission of information between subscribers (29) and a centrally arranged switch (3) have connector housings (9) comprising an electrical connector (9) at one end and a connection terminal (21) to an optical fiber at the opposite end. An electronic converter for converting between electric and optical signals is connected between the electrical connector and the optical connection. The electrical connection can be coupled to an electric connector (17) of the switch by a detachable electric connection cable (13). The converters in the connector housings are designed so that the optical transmission, in regard of the signals, as seen from the switch, operates as an electric signal line.

2 Claims, 6 Drawing Sheets

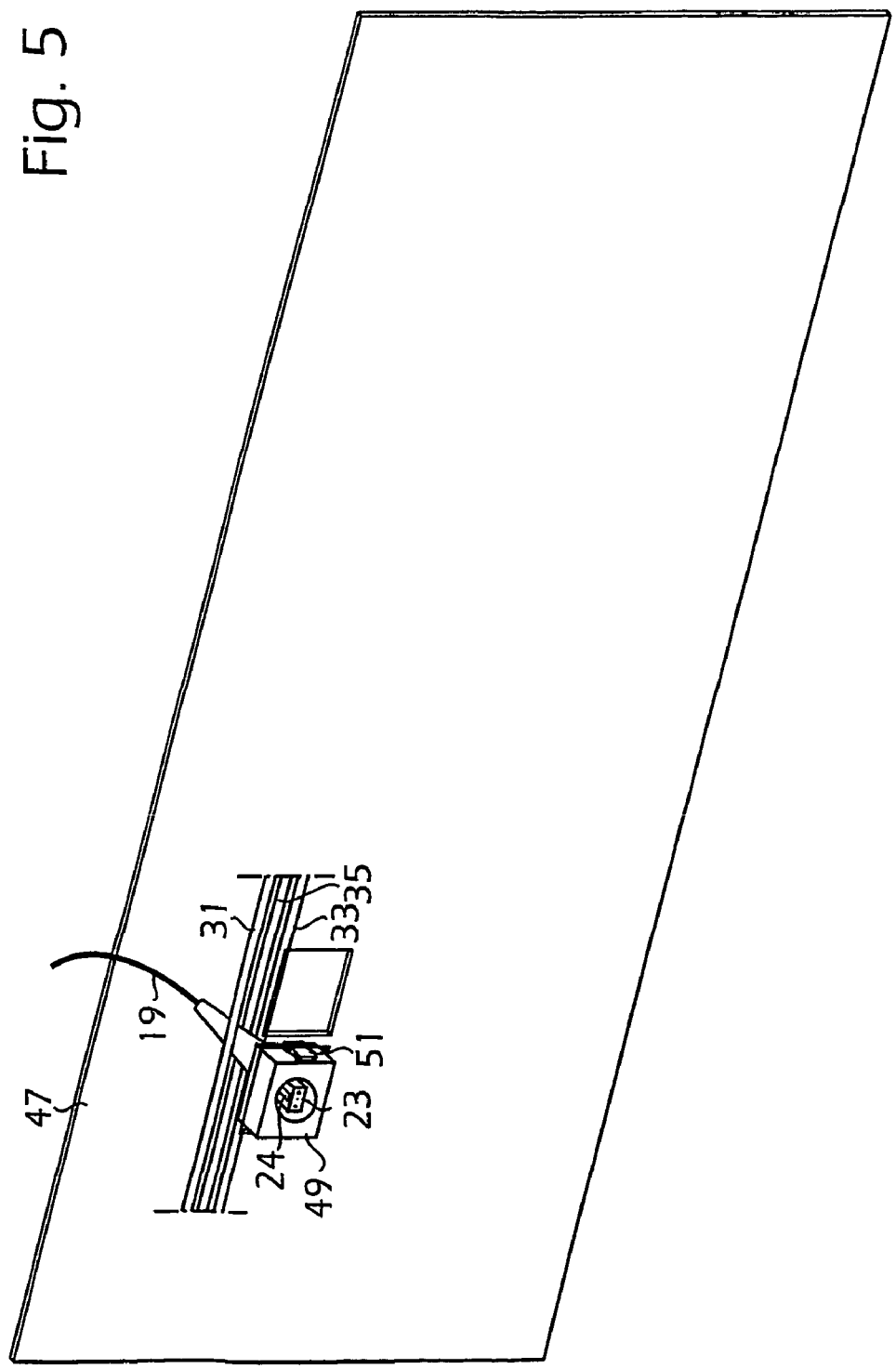

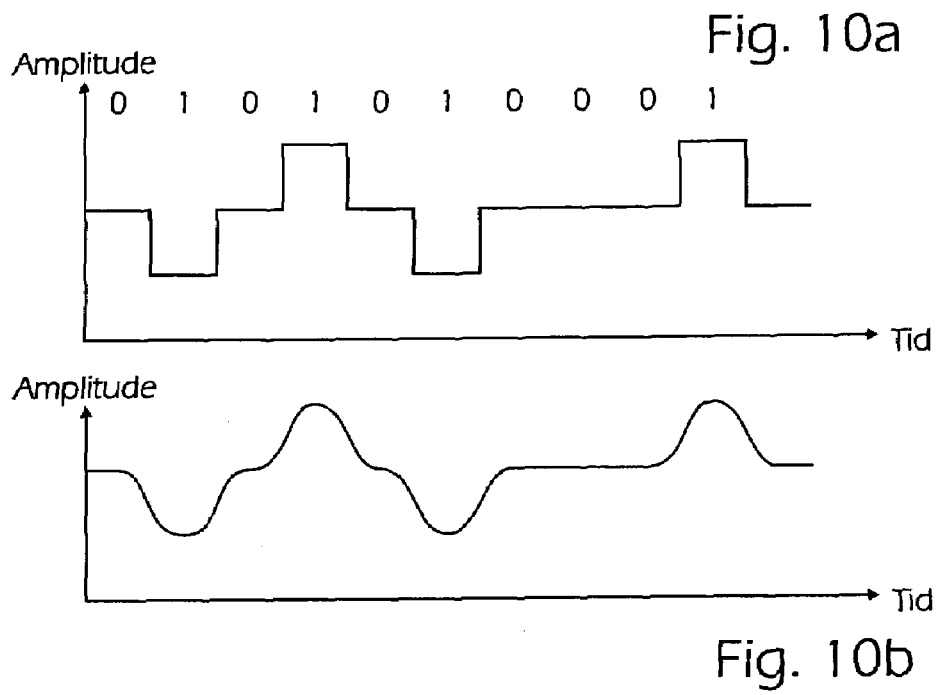
Fig. 10a
Fig. 10b
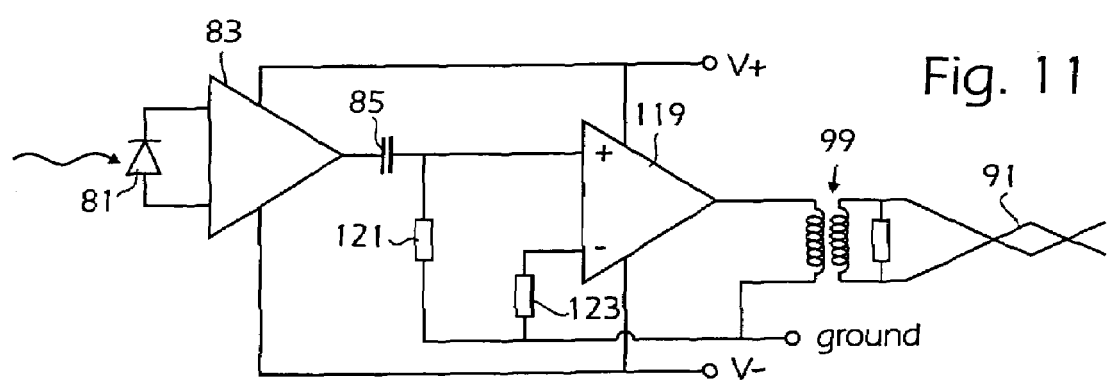
Fig. 11

NETWORK COMPRISING CONVERTERS BETWEEN ELECTRICAL AND OPTICAL SIGNALS

This application is the U.S. National Phase of International Application No. PCT/SE01/01967, filed Sep. 13, 2001, which claims priority to Swedish Application No. 0003257-3, filed Sep. 13, 2000.

TECHNICAL FIELD

The invention relates to coupling signals in optical fibers to electrical conductors and in particular a system and devices for connecting optical fibers to a central electric connection unit.

BACKGROUND OF THE INVENTION

The expansion of communication networks of the Ethernet type is today made both as previously to offices and to a particular great extent to private homes due to the fact that also private subscribers want to have access to broadband communication. For densely located private homes such as apartments in apartment buildings solutions are used which in principle are Ethernet-based local networks of the standard type used for offices. However, the structure of local networks for such apartments differs from that of local networks installed in offices by the fact that apartments in the same building are located at larger distances of each other than the rooms in an office. In addition, often the distribution of electric power is not made in the same careful way, in particular as to the distribution of a common electrical ground. For a network of the Ethernet type that utilizes electrical twisted pair conductors, the maximum distance is 100 meters between a connection node like a switch and a computer connected thereto. Such a limited maximum distance commonly results in that only a few apartments in an apartment building can be connected to the same switch, this resulting in a high installation cost per connected apartment due to the cost of the switch together with the fact that a special room that can be locked and possibly has climate conditioning must be provided. Possibly, electrically shielded cables could be used to avoid not permitted interference but this possibility is often very limited due to the unsatisfactory distribution of electrical ground. Furthermore, an electric cable is always installed for a particular transmission rate (bit rate) and its possibility of being capable of transferring information having a considerably higher rate is therefore limited.

By connecting subscribers in a local network by optical fibers the difficulties and disadvantages mentioned above are avoided. By using optical fibers thus all electromagnetic interference is avoided, communication is easily obtained over large distances and the information transmission can most often be fairly easily upgraded to higher rates by replacing components directly connected to the fibers. However, the cost for converting between optical and electrical signals is high when using conventional components.

The systems that are today offered for introducing optical fibers as part of transmission links in networks include in addition to the very optical fibers primarily relatively large, individual modules for converting between electrical and optical signals, each one of the modules connected to an individual optical fiber or individual optical fiber pair. The modules are collected at the switch in a rack and are by a short unshielded or shielded, electrical multi-conductor cable connected to the switch that is generally placed near the modules in the direct vicinity of the rack. Each module then has both an electrical connector and an optical connector on its "front side". Furthermore, each such module has a complete, electrical Ethernet interface and could thus also operate together with an electric connection cable, the length of which can comprise up to 100 meters. The modules are furthermore provided with electronic circuits that can verify the integrity of both the electrical connection and the optical connection by illuminating suitable light emitting diodes. Extremely seldom the possibility exists of directly verifying the total link in other ways than by a method related to a protocol of the type comprising the PING command in IP (the "Internet Protocol") to verify the connection with some IP address.

Switches having optical ports for a direct connection to optical fibers are also used but they are most often not less costly than the combination of a common electrical network switch having electrical output terminals and separate converter modules.

In order to change connections in networks it is common that the fixed connection to a peripheral unit/network terminal through a connector is available in a connection board that is coupled to the switch by short connection cables. A corresponding method of connecting that instead of electrical lines uses optical fiber cables can have significant disadvantages, since fiber cables are more easily mechanically damaged than electrical cables and since detachable optical fiber cables having at each end optical connectors mounted thereto are required instead of the short electrical connection cables or in addition to the electrical connection cables in the case where conventional converters for converting between electric and optical signals are used. However, optical connectors are costly and require a rather costly mounting operation, and thus such a switching feature in the network results in costs that are totally too high. An optical cable for use instead of electrical cables in local networks is disclosed in Japanese patent application 10079745. The cable has in each end connectors comprising circuits enclosed therein for converting between electrical and optical signals.

SUMMARY OF THE INVENTION

It is an object of the invention to provide systems and devices for transmitting signals between a central unit and subscribers that have a relatively low installation cost.

A simplified converter for converting between electrical and optical signals and arranged in an enclosure that can be given small dimensions is thus used for connection between a central unit such as a switch or a hub so that for transmission over the large distance between the central unit and the subscriber optical fibers are used and only a short electrical connection cable is used at the central unit and possibly also at the subscriber. The converter is arranged in an expanded housing of an electrical connector of standard type, such as an RJ45 connector. The housing has exterior dimensions that can be only somewhat larger than such a connector and at least the width and/or the thickness advantageously deviate only insignificantly from corresponding dimensions of the standard connector. However, the length can be larger. The converter has no protocol handling circuits and no light emitting diodes or other means for integrity checking and does not comprise any circuits for analyzing the signal content or for modifying it but operates completely transparently so that the transmitting link appears to the central unit as a completely electrical link.

Commercially available media converters for converting signals between twisted pair cables and optical fibers contain circuits for processing at least on one level above the purely physical transmission of the signal. Thus, in a signal that is to be transmitted in an optical fiber extra information is added for checking the integrity of the optical link. On the receiving side this information is retrieved and removed from the received signal and also other information is extracted in regard of a possible collision. The extracted information is used for energizing various light emitting diodes and thereby an operator can determine the operation of the converter and the optical link and also the electrical link. These different functions are executed in circuits that require fairly large power and also dissipate energy as heat. The proposed converter has a required power of one tenth to one twentieth of the power required by presently used media converters.

Generally thus, in a network in for example an apartment building, a partly optical transmission of information is provided using optical fibers between subscribers and a centrally arranged unit such as a switch or hub. Connector housings or converter housings or converter modules have an electrical connector at one end and some connection terminal such as an optical connector to an optical fiber at their opposite ends. An electronic converter for converting between electrical and optical signals is connected between the electrical connector and the optical terminal and is designed so that the optical transmission, as to the signalling and as seen from the central unit or switch, operates as an electrical signal transmission line. The electrical connector can be coupled to an electrical connector of the switch by a detachable electrical connecting cable or even directly or by a simple connector converter. Such a connection is allowed by the fact that the connector housings have a width and a thickness substantially corresponding to the width and the thickness of their electrical connectors. It also generally allows a dense arrangement of the connector housings so that they can be placed at a relatively small or minimum distance of each other that is mainly determined by the width and the thickness of the connectors. The fixed electrical connectors of a switch or hub is, as is well known, often placed at such a relatively small or minimum distance of each other that is mainly determined by the width and the thickness of the connectors. Connector sockets in a connection rack can be provided to hold optical connectors at the ends of optical fibers extending to the subscribers. The connector sockets can be designed so that in the case where no connector housing is connected the retained optical contacts become available to optical connection to possibly other components or through an optical detachable connection cable to an optical input terminal of a switch. The power supply of the converters can be provided by exterior electrical contact surfaces of the connector housings that cooperate with connector springs in a connection rack, through separate cables or through unused pins of the electrical connectors.

When converting optical signals in the shape of a stream of digital values represented by different optical power levels to electrical signals in the shape of a stream of digital values represented by different electrical levels at least one comparator or discriminator can be used to sense the different optical power levels and to provide from the output terminal of the comparator or discriminator electrical signals, having levels corresponding to the optical power levels, to an electrical line so that each electrical signal level corresponds to a single optical signal level. When converting electrical signals to optical signals a suitably biased light emitting diode can be directly modulated by the electrical signals. Generally thus, in the converters a substantially direct conversion between electrical signals in the shape of a stream of digital values represented by different electrical levels and optical signals in the shape of a stream of digital values represented by different optical power levels, so that an electrical level directly corresponds to an optical power level. The electrical levels can here have different signs whereas the optical power levels always are positive.

BRIEF DESCRIPTION OF THE DRAWINGS

The invention will now be described by way of a non-limiting embodiment with reference to the accompanying drawings in which:

FIG. 5 is a schematic perspective view of a connector socket retained in a front plate, that is transparently drawn, the socket used for the connector housing shown in FIGS. 2, 3*a* and 3*b*, FIG. 10*a* is a diagram of a three-level signal used in transmission at a high rate in a twisted pair cable, FIG. 10*b* is a diagram similar to that of FIG. 10*a* of a three-level signal that has been distorted by being transmitted in a twisted pair cable, and FIG. 11 is a circuit diagram of an alternative circuit for converting three-level signals transmitted in an optical fiber to electrical signals for forwarding in a twisted pair cable.

DESCRIPTION OF A PREFERRED EMBODIMENT

Figure 1:
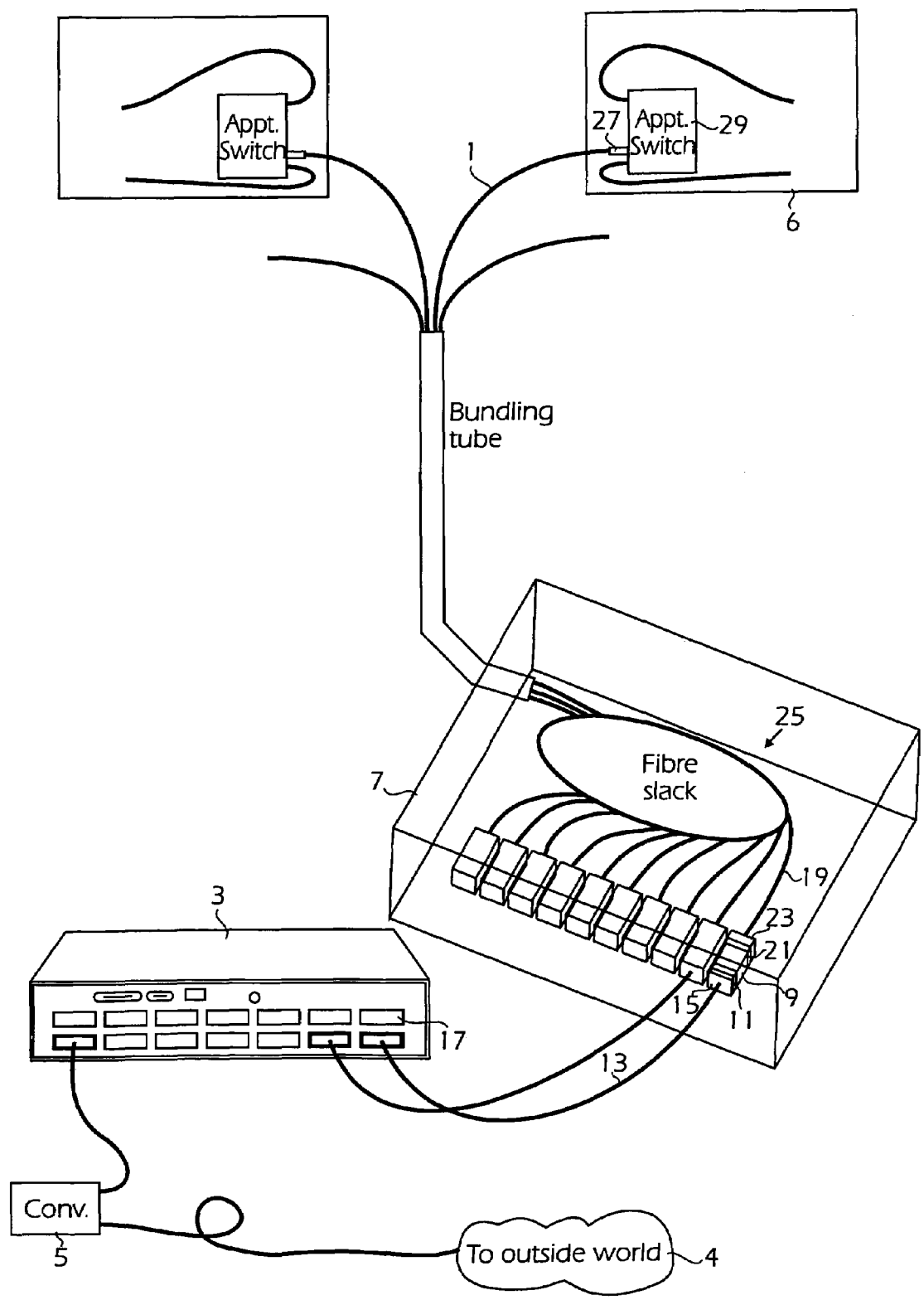
FIG. 1 is a schematic picture of the manner in which connection of different places in for example an apartment building can be accomplished to a communication network having a centrally arranged switch.

In FIG. 1*a* local network is schematically shown to be used in for example an apartment building. The network uses optical fibers 1 for the main portion of the transmission distances between a central switch 3, "Basement switch", often placed in the basement of the building, and the apartments, schematically indicated at 6. The switch 3 is the conventional electrical type made for signal transmission according to some standard such as Ethernet 10 Mb or Ethernet 100 Mb, in the embodiment preferred herein for transmitting signals in twisted pair cables, i.e. Ethernet 10BaseT or 100BaseT. The switch can be connected to an exterior optical high-speed network 4 through a high-speed converter 5. In the vicinity of the central switch 3 a rack or switch board 7 is placed, here illustrated as a switching box. In the rack, places having retainers are provided, see also FIG. 2, for receiving housings or modules 9 for a multitude of opto-electrical converters 10 for converting optical signals to electrical signals and vice versa. Each housing 9 is a separate unit and has on its front side an electrical connector 11 such as a connector of type RJ45, in the preferred embodiment a female connector. To the connector 11 is an electrical cable 13, a patch cable, preferably of the type twisted pair cable, connected through a corresponding connector 15, in the preferred case a male connector, and the patch cable is at its other end connected to an electrical port 17 of the switch 3, for example through the same kind of connector as used at the connector housings 9. The connector housings 9 are on their rear side that is directed towards the interior of the rack or towards their rear side connected to optical fiber pieces 19. The fiber pieces 19 can either be directly connected to the converters, so that the converter housings 9 containing the converters 10 are the "pig-tail" type or, as is preferred, on the rear side of each connector housing an optical standard connector 21 is provided, for example an MT ("Mechanical Transfer") connector of female type such as MT-RJ, mounted in a sleeve, and then each fiber piece has a corresponding connector 23 in the corresponding end, such as of male type MT-RJ. The fiber pieces 19 are at their other ends, in a space at the rear of the rack 7, at 25, welded to the fiber pieces 1, that extend away to devices 29 of type switches or network boards located in the individual apartments 6. Alternatively, each fiber piece 19 is part of a fiber piece 1, so that the fiber pieces 1 extend all the way up to the connector housings 9. In this alternative case the connectors 23 are then mounted directly to the ends of the fiber pieces 1 in the rack 7.

At the devices 29 connection housings 27 are provided which at one of their ends contain an optical connector, to which the corresponding fiber piece 1 is connected. The terminal housings furthermore contain converters, not shown, for converting optical signals to electrical signals and vice versa, and at their other opposite ends an electrical connector, preferably of type male connector. The power supply of the converters incorporated in the terminal housings 27 is provided either through a separately connected, low voltage transformer or "battery eliminator" or through pins not used for signal transmission in the electrical connector, that for example is the type RJ45, see the discussion hereinafter. The latter alternative requires that the devices or switches and similar devices, to which the electrical connector is coupled, must be specially designed in order to provide power supply to these pins. Alternatively, the terminal units 27 at the ends of the fiber pieces 9 in the individual apartments are constituted by converter housings 9 identical to those used in the rack 7 at the central switch 3 and are then placed individually in a small box containing means for supplying power to the converter located in the converter housing.

The converter housings or connector housings 9 that are centrally arranged in the rack 7 are designed to have a width that substantially agrees with the width of the electrical connectors 11, 15, for example of type RJ45 as has been described above, that are used for the electrical connection of the converters to the switch 3. Also the thickness of the converter housings can advantageously be substantially equal to the thickness of the electrical connectors, though this is not equally important in the preferred embodiment. Generally the width and the height dimensions of the converter housings should substantially agree with the corresponding dimensions of the electrical connectors and in any case at least one of these dimensions should agree with the corresponding dimension of the electrical connector. The term width of the connectors is herein intended to mean the horizontal dimension and the thickness of the connectors their vertical dimension when they are mounted with conventional orientation. The width and thickness of the connector housings 9 are in the same way taken as the horizontal and vertical dimensions respectively thereof when they are connected to electrical connectors mounted with the conventional orientation.

Figure 2:
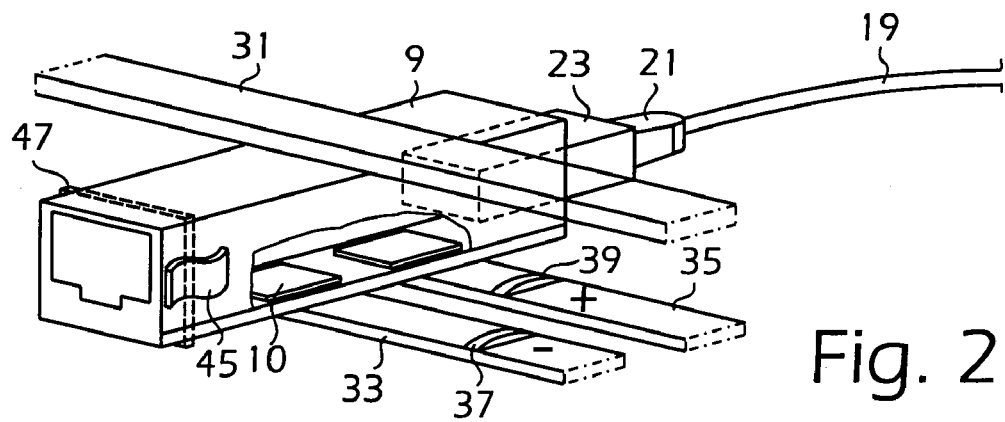
FIG. 2 is a schematic perspective view of an expanded connector housing arranged in a connection rack.

Electric circuits 10, see FIG. 2, are provided in each connector housing 9, and execute a preferably direct physical conversion from an electrical to an optical signal and a substantially direct conversion from an optical to an electrical signal, in particular so that an electrical level corresponds to an optical level and vice versa. The circuits are designed so that, from the sides of the switch 3 and the connected devices 29 it is not seen or experienced that part of the transmission path is optical. The electric circuits thus contain only the direct signal converting functions but no functions for special signalling such as protocol handling and similar things, for example analysis of the logical content in transmitted and received signals, addition and removal of extra information. This results in a relatively simple structure of the required electrical circuits and thereby they require a relatively small space so that they can be received in the connector housings and so that they have a relatively small need for electrical power. Using a simple conversion is in the preferred case possible by the fact that receiving or detection circuits for signals transmitted in twisted pair cables are specially designed to be capable of handling the often very strongly distorted signals that are received after transmission in such lines and to then be capable of detecting the information content in such signals and by the fact that the substantially direct, non-linear conversion according to the description above gives a distortion of the signal similar to the distortion to which signals are submitted when they pass a piece of twisted pair cable.

Figure 3A:
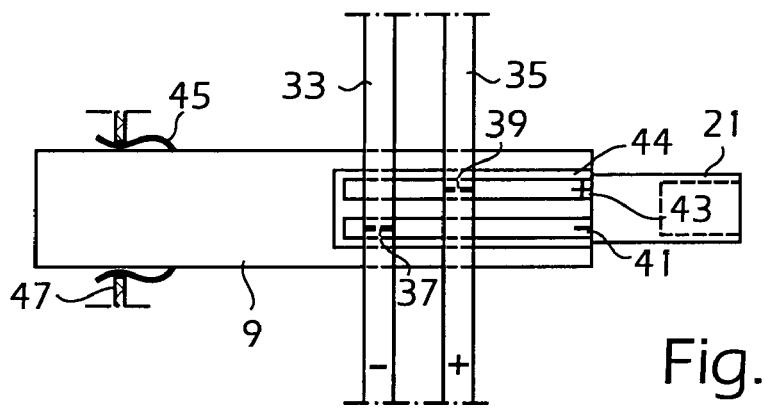
FIG. 3*a* is a view from above of the connector housing of FIG. 2 mounted in a rack.

The power supply of the circuits is obtained either through separate lines, not shown, or by connector springs, see FIGS. 2 and 3a, that are attached to the retainers in the rack 7 and act against predetermined contacting places on the outside of the connector housings 9. The power supply can also be provided by unused pins or contact places in the electrical connectors 11, 15, see furthermore the description with reference to FIG. 6.

The fiber pieces 19 that are connected between the converter housings 9 and the welds 25 to the longer optical fibers 1 that extend the major portion of the path to the subscribers, can be provided, as has already been mentioned above in the case where they are not directly connected to the corresponding optical electrical converters 10, with connectors 23 at their ends at the converters and thereby also being directly available in the front plate 7 for possible connection to an optical connection cable. A socket 49, see FIG. 5, for the optical contact connectors 23 can be provided and have such a structure that it allows a direct optical connection to a connector housing 9 comprising opto-electrical conversion and so that it is pressed longer in behind the front side of the plate 7 when the connector housing is pressed into its place in the rack. When the connector housing 9 is taken out for replacement, repair or upgrading, the connector socket accompanies it and the connector 23 again becomes available in the front plate. Alternatively, the end of the fiber pieces 19 having the connectors must be somewhat extracted for connecting or removing the respective connector housings 9 and the fiber pieces therefore have some excess length so that it can be accomplished.

More details of the mounting of the converter housings or connector housings 9 in the rack appear from FIGS. 2 and 3a. The converter housings 9 have an exterior shielding metal enclosure that is intended to be coupled to chassis ground and that has a shape of a rectangular elongated box. At the front of the box the housings continue into the electrical female connectors 11 that thus have the same exterior dimensions in the transverse direction as the elongated converter housings. The upper large surfaces of the housings 9 are in the case where the connector housings 9 are inserted in the rack 7 engaged with an upper support 31 having the shape of a horizontally arranged rail extending in the transverse direction. The bottom surfaces of the converter housings 9 rest against two lower, electrically conducting rails 33, 35, that also extend in the transverse direction, in parallel to the front side of the rack 7 and are horizontally arranged. Using the lower rails, supply of power to the converters in the connector housings 9 can be provided. The front power supply rail 33 is coupled to a negative supply voltage V− and the rear power supply rail 35 is coupled to a positive supply voltage V+. The power supply rails have upwards projecting connector springs 37, 39 for electrical contact with delimited, electrically conducting surface areas 41, 43 on the bottom surfaces of the module housings 9. These electrically conducting areas 41, 43 are electrically isolated from the remaining, grounded part of the housings 9 by isolating, surrounding areas-44. The areas 41, 43 can be portions of a conducting plane in an electrical circuit board, this plane moreover being connected to ground. From FIGS. 2, 3a it furthermore appears that snapping springs 45 can be arranged at the front end of the surfaces of the module housings for cooperating, when the module housings 9 are pressed into their places in the rack 7 through openings in the front plate 47 of the rack, with edges of these openings to maintain the converter housings at their places in the rack.

Figure 4:
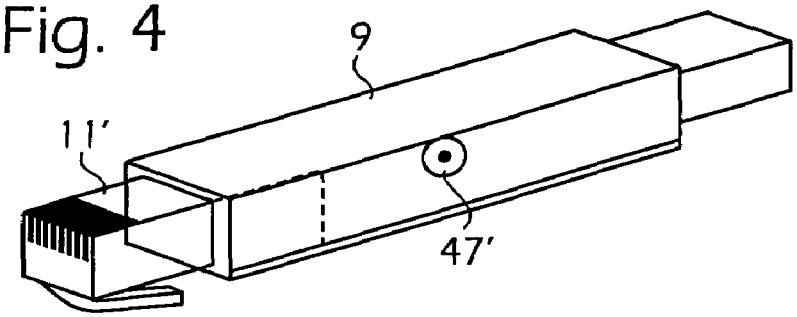
FIG. 4 is a perspective view of an expanded connector housing for direct connection to a device, such as to a switch, a hub or a network board.

The connector housings 9 can also be designed to have other electrical connectors of suitable types, for example configured as male connectors, so that they can be directly coupled to the ports 17 of the switch 3 in the same way as for the terminal housings 27 in the apartment ends according to the first alternative described above. Alternatively, a connector housing 9 of the design described above can be converted to obtain a suitable electrical connector by coupling a terminal converter, not shown, thereto. An embodiment of a connector housing having a male connector is illustrated in FIG. 4. It appears from this figure that the module housing 9 in this embodiment at its front end instead continues to a male connector 11' of type RJ45 having transverse dimensions identical to those of this connector. Supply of power to the electrical circuits in the connector housing can be provided through unused pins in the electrical connectors, as has been mentioned above, or by an exterior electrical cable, not shown, connected through a connector pin of a standard type to a power supply connector 47' mounted at a surface of the module housing 9. Instead of the electrical connector cables 13, in this case optical fiber pieces or coupling lengths, not shown, having optical connectors at each end must be used. However, this solution has disadvantages in that such detachable fiber lengths are delicate as to handling and in that they are rather costly because of the optical connectors, as has been discussed above.

Figure 3B:
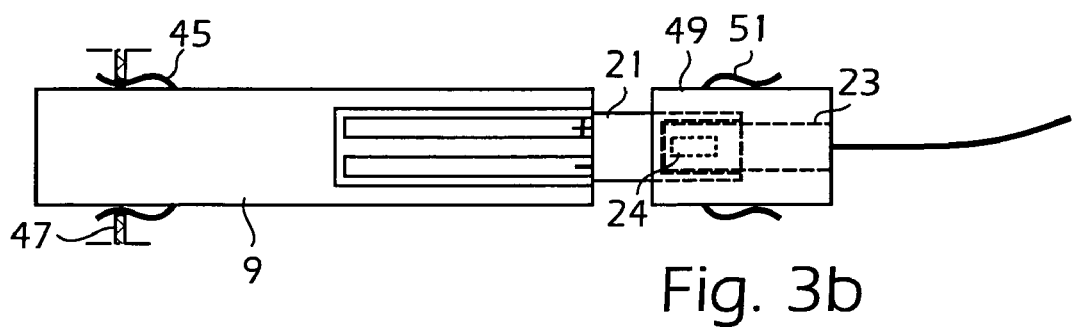
FIG. 3*b* is a view from underneath of a connector housing having a connector socket attached thereto.

In FIG. 5 the connector socket 49 mentioned above is shown that can be provided at each place arranged for a connector housing 9 in the rack 7, see also FIG. 3b. The connector socket 49 can have the same exterior dimensions in the transverse direction as those of the connector housing 9 and contains a space or bore in which an optical connector 23 having a locking spring 24 of for example type MT-RJ is securely held. On the right and left side surface of the connector socket snapping springs 51 are provided for cooperating with edges of an opening of the front plate wall 47 in a way similar to the snapping springs 45 on the connector housings. Initially thus, such a connector socket 49 is assumed to be seated in a front position having its snapping springs 51 engaged in an opening of the front plate wall 47. To the optical connector 23 that is then available, an optical fiber cable can be directly coupled or in the case where it is desired, such as when connecting to a switch having optical connectors or when using an opto-electrical converter of a type different from that provided in the connector housings 9. For the connection illustrated in FIG. 1, in the case where a connection of the optical fiber 19, to which the connector 23 is mounted, is to be made to the switch 3 through a connector housing 9 the connector housing together with its rear optical connector 21 is pressed against the optical connector 23 in order to establish optical contact. The locking spring 24 can then engage with the connector 21 mounted on the housing to hold the optical connectors 23, 21 at each other and thereby the connector socket 41 at the connector housing 9. Then the housing 9 is pressed further into the rack 7 and then presses against the connector socket 49 so that the snapping springs 51 thereof are detached from the engagement with the edges of the front plate opening and the connector housing and the connector socket move as a single unit further into the rack. Finally the snapping springs 45 of the connector housing come into engagement with the front plate opening and the housing has been inserted into the rack and has been optically connected. An electrical connection cable 13 can then be mounted between the connector housing 9 and a receptacle 17 on the switch 3.

When the connector housing 9 at some later occasion must be retracted out of the rack 7 for repair or similar operations, in an extraction movement the connector socket 49 will accompany the movement due to the engagement between the two optical connectors 21 and 23 produced by the locking spring 24. The connector socket will then again be snapped at the front plate 47 by its snapping springs 51. The optical connectors 21, 23 can then be detached from each other by acting on the locking spring 24 by a suitable tool, so that the connector housing 9 becomes detached from the rack 7 in order to be for example repaired or replaced. The optical connector 23 retained by the connector socket 49 is now again available for a new connection to a connector housing or to some other device through an optical fiber cable provided with an optical connector suited for coupling to the connector 23. The movement of the optical connector 23 in the extraction is allowed by the fact that the optical fiber pieces 19 are given a suitable length. They can also advantageously have such a length that also the connector socket 49 can be extracted from the front plate 47 if it for some reason would be required.

Figure 6:
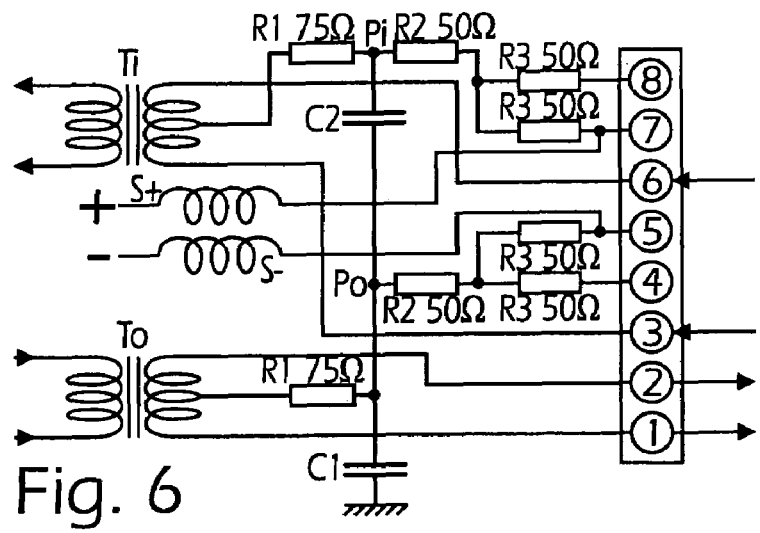
FIG. 6 is a circuit diagram of the electrical connections inside a device that uses unexploited connector pins for providing an electrical supply voltage.

In the case when power supply is arranged by using unexploited individual contact places or contact pins in the electrical connectors this can be made as is illustrated in FIG. 6. There a circuit diagram is shown to be used for RJ45 connectors in a connection mode according to the standard 10BaseT. In the RJ45 connector the pins Nos. 4, 5, 7 and 8 are not used. Incoming signals are received on the pins Nos. 3 and 6 and outgoing signals are transmitted on the pins Nos. 1 and 2. The contact pins of the balanced incoming and outgoing signals are connected to the outermost ends of first windings of transformers Ti, To, the other windings of which are connected to the respective input and output circuits, not shown, of a device, in which the connector is mounted. The first windings of the transformers have center taps at which, for a standard connection of the connector, both are through resistors R1 connected to the same center voltage at a node P1. The connection node P1 is in the standard connection also coupled to the unused connector pins through electrical star networks including resistors R2, R3 having the same resistance as each other. The connection node P1 is also through a rather large capacitor C1 connected to ground so that this node, as experienced by AC signals, is grounded but has a floating DC potential.

In a switch 3 or device 29 or another device in which the electrical connector is mounted and for which power supply of other devices is desired, through the same cable as that used for the signal transmission the pins not carrying signals can be used as has been already mentioned. In order that it will be possible to apply a supply voltage to the pins not used for signal transmission, the node P1 can be divided in two connection nodes Pi and Po, which are connected to each other through a large coupling capacitor C2. Each such connection node Pi, Po is then through one of the resistors R1 connected to the center tap of the first winding of the respective transformer and through the resistor R2 to line branches that contain resistors R3 and extend to the pins Nos. 7, 8 and Nos. 4, 5, respectively. Only one Po of the connection nodes is now through the capacitor C1 coupled to ground. A supply voltage from some voltage source, not shown, is through inductances S+, S− provided to two of the pins not used for signal transmission, for example with its positive pole to pin No. 7 and its negative pole to pin No. 5. The outgoing signal will thereby be applied around the negative potential of the supply voltage whereas the incoming signal is applied around the positive potential of the supply voltage. The capacitor C2 proposed herein provides DC isolation between the two groups of connector pins Nos. 4 and 5 and Nos. 7 and 8, respectively, and between positive and negative potential of the supply voltage. On the contrary, the nodes Pi, Po are, as experienced by AC signals, connected to each other due to the large capacitance of the capacitor C2 and they are applied, as formerly node P, at the AC ground due to the capacitor C1. Furthermore, the inductors S+, S− isolate the voltage source from possible high frequency components that can be produced in the long electrical conductors in the electrical cable that is coupled to the pins now used for providing the supply voltage.

Figure 7:
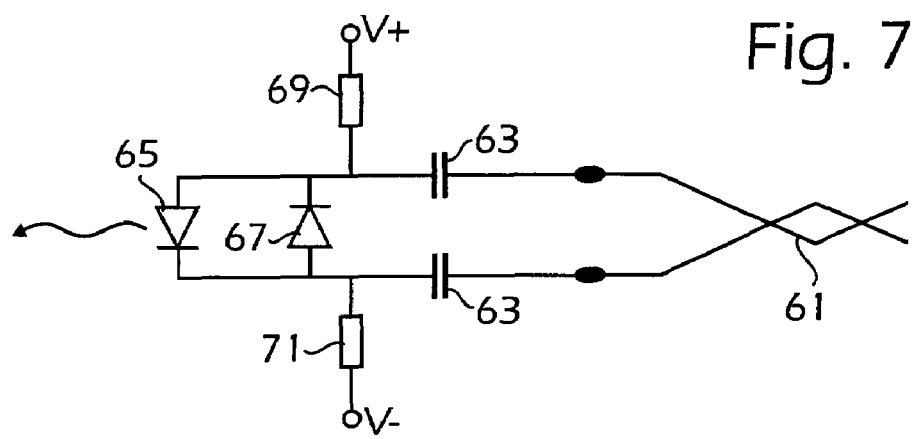
FIG. 7 is a circuit diagram of a circuit for converting electrical signals transmitted on a twisted pair cable to optical signals.

In the connectors 9 conversion from a balanced binary electrical signal, i.e. a serial bit-stream transmitted in a standard manner in a twisted pair cable 61, in which the signal alternates between two levels, can be made using the circuit illustrated in FIG. 7. The signal arrives from the two parts of the pair cable to coupling capacitors 63, pass essentially unaffected through them up to the two terminals of a light emitting diode 65 such as an LED or semi-conductor laser diode. The terminals of the light emitting diode are furthermore connected to each other by an inversely or oppositely connected rectifying semi-conductor diode 67. One of the terminals is furthermore connected to a positive supply voltage V+ through a resistor 69 and the other terminal is coupled to a negative supply voltage V− through a resistor 71. By a suitable choice of the biasing current flowing through the diode 65 the signal incoming from the twisted pair cable 61 can modulate the light emitted by the diodes 65, so that an acceptable, not too large distortion of the emitted optical signal is produced. The emitted light alternates between two different levels and the distortion can be made so small that a later detection of the signal by a conventional receiver for signals transmitted in a twisted pair cable can be performed. The light emitted by the diode 65 is conducted to the optical fiber connected to the converter housing 9, possibly through an intermediate wave guide. The same circuit can be used for converting all electrical signals that in a balanced way arrive in the pair cable 61, also for signals having more than two levels.

Figure 8A:
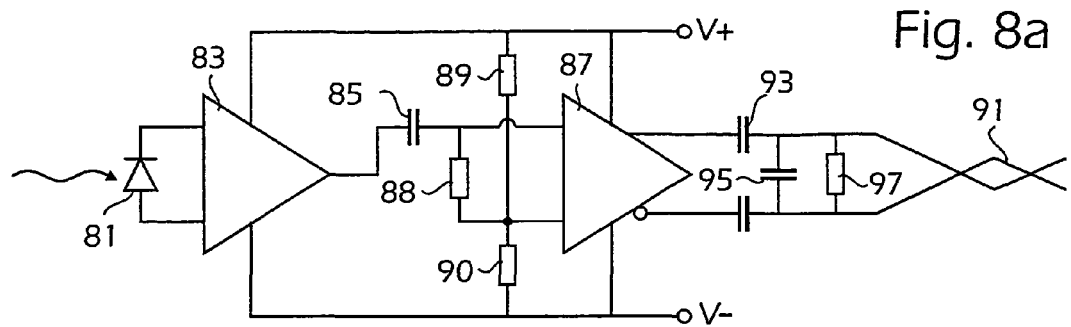
FIG. 8*a* is a circuit diagram of a circuit for converting signals transmitted in an optical fiber to electrical signals for forwarding in a twisted pair cable.

The signal thus converted to a varying light intensity must again be converted to an electrical signal provided to the pair cable on the other side of the fiber. Then, the following can be observed. On a line for transmission in a twisted pair cable according to the Ethernet standard of signals at 10 Mb/s a rest level or 0-lever is provided, a positive pulse used for link integrity signalling, and positive and negative levels that in Manchester code forward the signal. Thus it is important that a genuine AC signal and not only varying levels is obtained for the signal in the electrical line in order that it should have the same appearance as standard signals. The electronic circuit should be capable of converting varying light levels, that can never directly correspond to an AC current or AC voltage, to an AC voltage in the line for the electrical signal and to a positive pulse having some negative shoot-over which the detector according to the respective IEEE standard should be capable of accepting. For transmission at 100 Mb/s in a twisted pair cable a rest level or 0-level and a positive level and a negative level for signalling are provided. It is also here important that a genuine AC current or AC voltage signal and not only varying levels is obtained in the electrical line. Such a circuit that can be used for detecting optical signals having a frequency of 10 MHz, obtained for example from a piece of a twisted pair cable connected upstream, is illustrated in FIG. 8*a*. The light signal is received by a light sensitive diode 81, the two terminals of which are directly connected to the terminals of an amplifier 83. The amplified signal is provided through a coupling capacitor 85 to the first input terminal of a comparator or discriminator 87 having one direct and one inverting output terminal. To the second input terminal of the discriminator a suitable reference voltage is connected that is obtained from the center point of a voltage divider formed by two resistors 89, 90 of suitable sizes that are connected between the positive supply voltage V+ and the negative supply voltage V−. The center point of the voltage divider is also connected to the first input terminal through a resistor 88. The signal from the discriminator 87 is provided from the two output terminals thereof to respective parts of the twisted pair cable 91 through further coupling capacitors 93 which on the twisted pair side in addition are connected to each other by a capacitor 95. A resistor 97 can be connected in parallel to the latter capacitor.

Figure 8B:
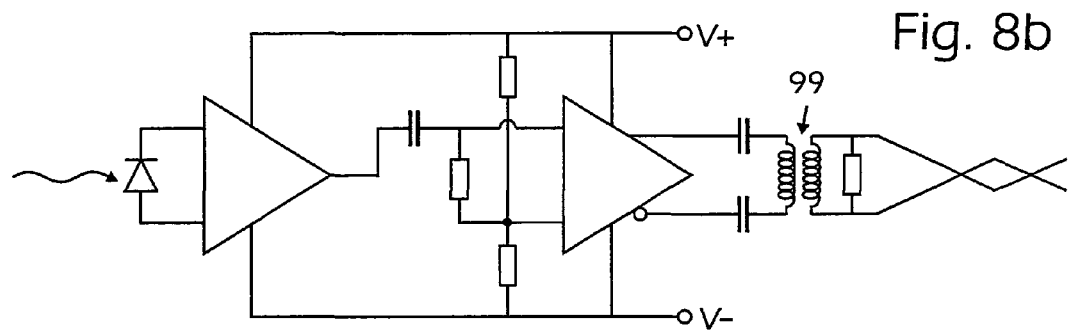
FIG. 8*b* is a circuit diagram similar to that of FIG. 8*a* comprising a transformer for coupling signals to the twisted pair cable.

The coupling to the pair cable 91 can alternatively be made by using a signal transformer 99, as is illustrated in FIG. 8*b*.

Figure 9:
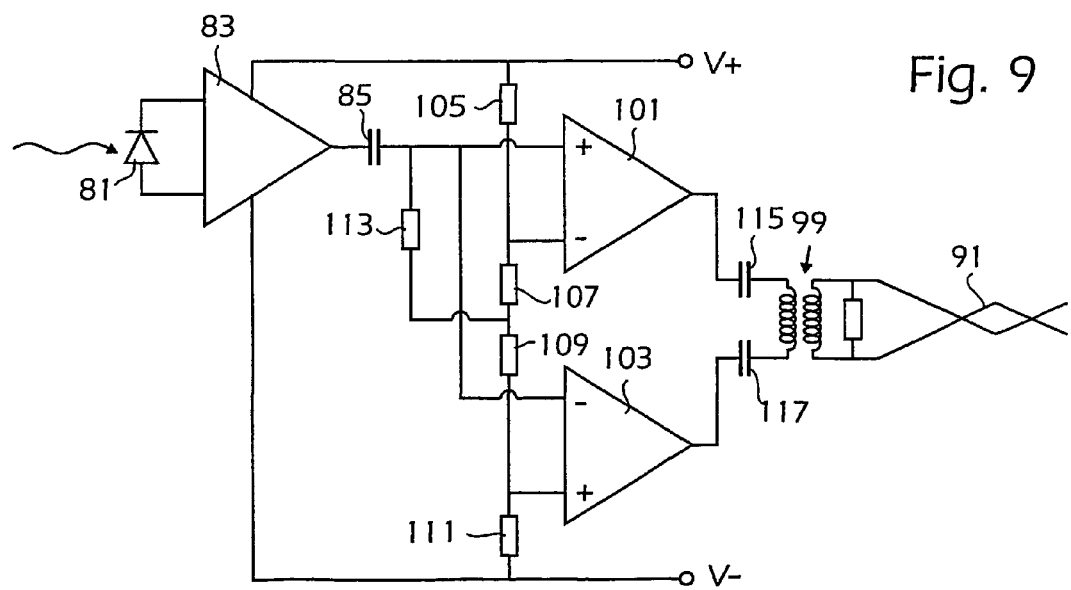
FIG. 9 is a circuit diagram of a circuit for converting three-level signals transmitted in an optical fiber to electrical signals for forwarding in a twisted pair cable.

For higher frequencies or transmission rates such as for 100 MHz and according to a suitable standard signals are transmitted on twisted pair cables at three levels, a center level indicating the binary value "0", and levels symmetrically located around this level which both indicate the binary value "1" and which are used alternatingly with each other, see FIG. 10*a*. After trans-mission over a link comprising a twisted pair cable the signal can then have an appearance as seen in FIG. 10*b*. Such an electrical signal can be directly converted to an optical signal using the circuit illustrated in FIG. 7 and the corresponding optical signal can be converted to an electrical signal using the circuit illustrated in FIG. 9, so that optical amplitude or power levels are made to correspond to electrical amplitude levels. The light signal is first converted to an electrical signal by the photodiode 81, the electrical signal is amplified by an amplifier 83 and is allowed to pass through a coupling capacitor 85 in the same way as in FIGS. 8*a* and 8*b*. The obtained signal is provided to the positive and the negative input terminal, respectively, of two comparators 101, 103. The two other input terminals of these comparators receive reference voltages from a voltage dividing ladder that is connected between the positive supply voltage V+ and the negative supply voltage V− and comprises four resistors 105, 107, 109, 111 connected in series with each other. The connection node between the resistors 105, 107 gives the desired reference voltage for the first comparator 101 and is provided to the negative input thereof. The connection node between the other two resistors 109, 111 in the ladder gives the desired reference voltage for the second comparator 103 and is provided to the positive input terminal thereof. The center node of the ladder, at the connection point between the resistors 107 and 109, is coupled to the output side of the coupling capacitor 85 through a resistor 113. The output terminals of the comparators 101, 103 are in a way similar to that of the circuit according to FIG. 8*b*, through coupling capacitors 115, 117 connected to each end of a winding of a signal transformer 99, the second winding of which has its ends connected to the parts of a twisted pair cable 91. For a suitable choice of the sizes of the resistors in the voltage divider ladder reference voltages for the comparators 101, 103 can be produced, so that a level of the incoming signal that is above the reference voltage which is provided to the first comparator can be discriminated and give a positive output level, and that a negative level of the incoming signal that is lower than the reference voltage provided to the second comparator 103 can be discriminated and produce a negative output signal.

Another embodiment of a converter for converting from optical to electrical signals, particularly suited for three-level signals according to the discussion above, is illustrated in FIG. 11. A light signal from an optical fiber is first converted to an electrical signal by the photodiode 81, the electrical signal is amplified by an amplifier 83 and is made to pass a coupling capacitor 85 as in FIGS. 8*a*, 8*b* and 9. The produced signal is provided to one input terminal of a broad-band amplifier 119, the output terminal of which is connected to ground potential through the primary winding of a transformer 99, the secondary winding of which is as above connected to the pair cable 91. The ground potential is advantageously located centrally between the supply voltages V+ and V−. Furthermore, the two input terminals of the amplifier are connected to ground through resistors 121 and 123 respectively. For a suitable choice of the sizes of these resistors the amplifier 119 can be given such zero-point biasing, that a rest level in the incoming light signal results in zero current through the transformer 99 and an increased light signal level results in a positive current through the transformer and a lowered light signal levels results in a negative current through the transformer.

Converters designed in this way require for their operation a power of the magnitude of order of 150 mW that is much smaller than the power of 3 W that the corresponding units designed for signal transmission according to the standard Ethernet usually require.

Arranging individual converter units mounted in a plate or board gives advantages comprising that a simple mark-up of connections can be arranged, i.e. a good overview is obtained, and that replacement and service of the converter units can be made individually for each subscriber line. Only converter units for installed subscriber lines must be provided. A simple individual upgrading to higher transmission rates can also be performed by only replacing the respective unit/units.

The invention claimed is:

1. A network for transmitting information between subscribers and a central unit, the network comprising:
   transmission links between the central unit and each of the subscribers,
   each transmission link comprising:
     at one end at the center unit, an electrical connection line,
     an optical fiber coupled to the electrical connection line, and
     at the coupling between the electrical connection line and the optical fiber, a converter for converting between electrical and optical signals,
   the central unit comprising ports for connection to the electrical connection lines for receiving and transmitting electrical signals,
   connector housings, each having an electrical connector at one end and at an opposite end means for connection to an optical fiber, each connector housing receiving one of the converters, which is connected between the electrical connector and the means for connection to the optical fiber, the electrical connector being designed for cooperating with a complementary electrical connector mounted on the electrical connection line,
   the converter for converting optical signals to electrical signals comprising an electrooptical detector connected to a broadband amplifier having an output terminal connected to the primary winding of a transformer, the secondary winding of the transformer being connected to an electrical transmission line, the amplifier having such a setting of its zero-point that a rest level of an incoming light signal results in zero current through the transformer and a higher light signal level gives a positive current through the transformer and a lower light signal level results in a negative current through the transformer.

2. A network for transmitting information between subscribers and a central unit, the network comprising transmission links between the central unit and each of the subscribers, each transmission link comprising:
   an electrical connection line of twisted pair type connected at one end to the central unit,
   an optical fiber connected to the electrical connection line at the opposite end thereof, and
   a connector housing at the coupling between the electrical connection line and the optical fiber, the connector housing having an electrical connector at one end for connection to the electrical connection line and at an opposite end means for connection to the optical fiber and further including a media converter for converting between electrical and optical signals,
   wherein the media converter:
     converts from an electrical signal to an optical signal, said electrical signal being a twisted pair electrical signal according to the Ethernet 10BaseT or 100BaseT standard and said optical signal being an optical representation of the information content of said electrical signal, and
     converts from an optical representation of a twisted pair electrical signal according to the same standard to a twisted pair electrical signal that is directly usable by a receiver or detector adapted for receiving/detecting twisted pair electric signals according to the same standard,
   wherein at least one of the media converters that is included in one of the transmission links and is adapted for converting optical signals to electric signals comprises an optoelectrical detector, a broadband amplifier and a transformer, the optoelectrical detector connected to the broadband amplifier, the broadband amplifier having an output terminal connected the primary winding of the transformer, the secondary winding of the transformer connected to the electrical connection line included in the respective transmission link, the broadband amplifier having such a setting of its zero-point that a rest level of a light signal incoming to the optoelectrical detector results in zero current through the secondary winding of the transformer and a higher light signal level gives a positive current through the secondary winding of the transformer and a lower light signal level results in a negative current through the secondary winding of the transformer.

* * * * *